No. 634,895. Patented Oct. 17, 1899.
J. A. MANNING.
EXCELSIOR CUTTING MACHINE.
(Application filed Oct. 15, 1898.)
(No Model.)

Witnesses. Inventor.

United States Patent Office.

JAMES ALBERT MANNING, OF TORONTO, CANADA, ASSIGNOR OF ONE-HALF TO DAVID FREDERICK MAGUIRE, OF SAME PLACE.

EXCELSIOR-CUTTING MACHINE.

SPECIFICATION forming part of Letters Patent No. 634,895, dated October 17, 1899.

Application filed October 15, 1898. Serial No. 693,645. (No model.)

*To all whom it may concern:*

Be it known that I, JAMES ALBERT MANNING, commercial traveler, of the city of Toronto, in the county of York, in the Province of Ontario, Canada, have invented certain new and useful Improvements in Excelsior-Cutting Machines, of which the following is a specification.

My invention relates to improvements in rotary cutters designed more particularly for slitting shavings produced from a block in a machine for making excelsior packing; and the object of the invention is to design a device of this class whereby the shavings may be slit free from dust cheaply, quickly, and effectually with a minimum amount of power; and it consists, essentially, of two rotary cutters, each comprising a series of disks suitably separated by collars right angular in cross-section and arranged so that the edges of the disks of one cutter extend between and pass the peripheral edges of the disks of the adjacent opposite cutters, the shaving being fed up between the cutting edges, which are the edges which pass each other, suitable strippers for the rotary cutters being provided, and a feeding device to carry the shavings between the cutters, as hereinafter more particularly explained.

Figure 1:
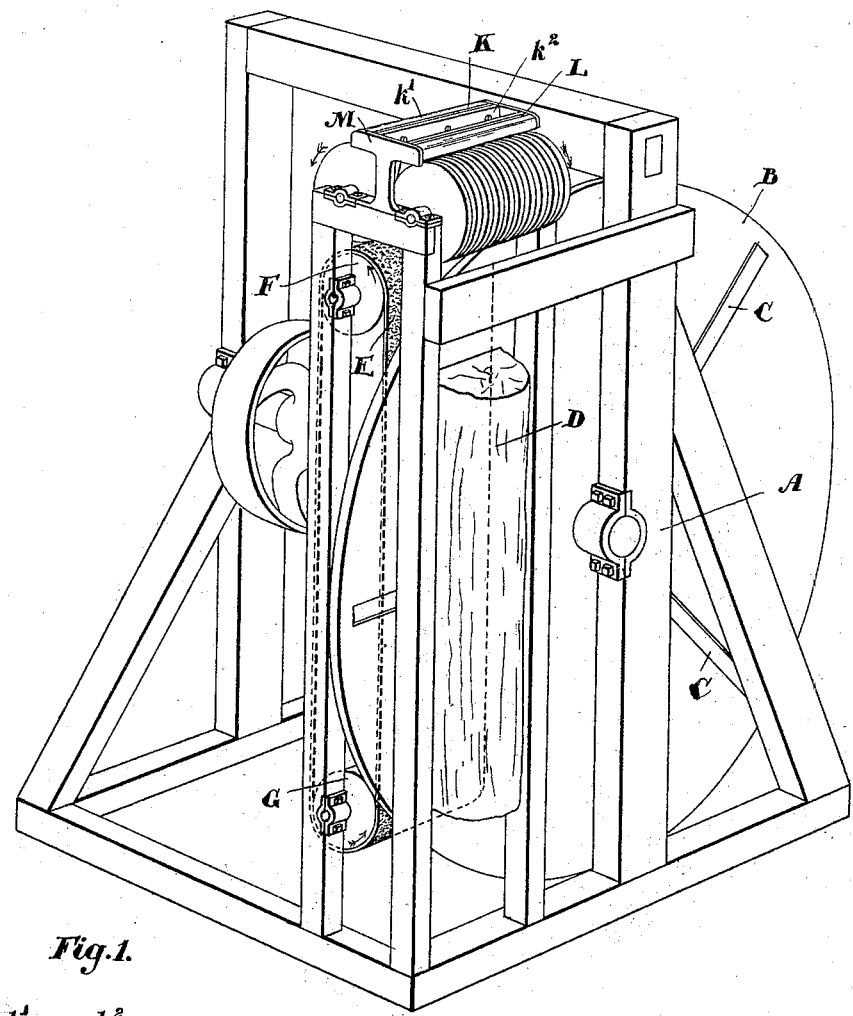
Figure 3:
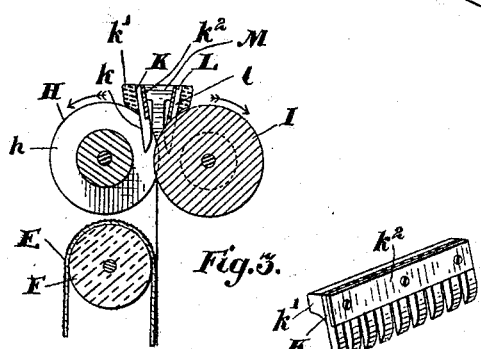
Figure 4:
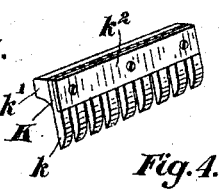
Figure 2:
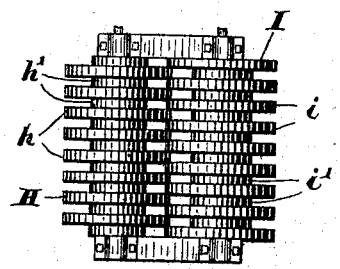

Figure 1 is a perspective view of a machine for cutting shavings, showing my slitting rotary cutters in proper relative position. Fig. 2 is a plan view of the cutters. Fig. 3 is a cross-section. Fig. 4 is a detail of the stripper.

In the drawings like letters of reference indicate corresponding parts in each figure.

A is the frame of the machine.

B is a disk-wheel provided with suitable cutters C to cut longitudinal flat shavings out of the block D. These flat shavings are carried up by the belt E, supported on suitable pulleys F and G, journaled in the frame of the machine, to the rotary cutters. The surface of the belt is preferably roughened, as indicated in Figs. 1 and 3.

H and I are the rotary cutters, which are supported in suitable bearings preferably above the conveying-belt E. The rotary cutter H is made up of a series of disks $h$, right angular in cross-section, with peripheral sharp edges between the face and the periphery on each side, and separating-collars $h'$ of corresponding width to the disks $h$, or substantially so, being of course necessarily a shade wider in order to admit of the cutters $i$ of the opposite rotary cutter I.

The disks of the opposite rotary cutter I are identically formed of substantially the same width, so that they will extend between the spaces between the disks $h$, being just a shade narrower than such spaces, so that they may pass the contacting peripheral face edges of the disks $h$. Collars $i'$ are provided between the disks $i$, similar to the collars $h'$ between the disks $h$. Of course these disks and collars may be cut out of solid metal as long as spaces are left between them, as hereinbefore referred to, although I preferably form them in the way described. It will also be understood that the peripheral face of each disk may be grooved, it being essential, of course, that the cutting edges are provided one on each side of the disk and extend around the entire periphery thereof. The shaving is fed as indicated in Fig. 3.

K is the stripper for the rotary cutter H, and L is the stripper for the rotary cutter I. The stripper K is formed of a series of teeth $k$, which are secured to a suitable cross-bar $k'$ by a suitable plate $k^2$. The cross-bar is supported in the ends on a suitable standard M. The stripper L is similarly formed, secured, and supported, being provided with suitable teeth $l$.

In Fig. 3 I show the passage of the shaving up through the rotary cutter, such shaving being fed by the endless belt E, which has a roughened surface, as hereinbefore described. The rotary cutters rotate in the direction indicated by arrow. The strippers K and L, acting on the cutters, prevent the shavings or slitted wood passing and filling up between each set of disks on each side, also serving to guide them right through between the strippers and out.

I find in practice that by using the cutters such as I describe I am enabled to produce shavings cut into strips of equal width, as there are absolutely no broad shavings ejected from my cutters. Consequently the material which I produce is of the best quality it is possible to obtain. I also find in practice that in feeding the shaving the natural curl of the shaving causes the ends to engage with the roughened surface of the belt, which is an important desideratum, as such roughened surface effectually grips the ends of the shaving, thereby retaining it in position as it is being fed between the cutters.

What I claim as my invention is—

In combination the rotary cutters and the strippers depending between the same, the endless belt provided with an adhesive or roughened carrying-surface and supported on suitable rollers, so that the feeding portion of the belt is in a vertical position directly underneath the center of the cutters and the shaving-wheel having the back face thereof extending into proximity with the belt and the knives rotating in a parallel plane in the opposite direction to that in which the belt is driven whereby when the shaving is cut and passes through the knife-slit the friction-grip of the belt confines it in a straight course and carries it upwardly between the cutters and in an opposite direction to that in which the knives tend to carry it as and for the purpose specified.

JAMES ALBERT MANNING.

Witnesses:
   B. BOYD,
   WALTER H. ARMS.